United States Patent [19]

Mehta

[11] 4,412,050
[45] Oct. 25, 1983

[54] LINEAR POLYMERS FROM BLOCKED VINYL BIPHENYL COMPOUNDS

[75] Inventor: Avinash C. Mehta, Belmont, Mass.

[73] Assignee: Polaroid Corporation, Cambridge, Mass.

[21] Appl. No.: 222,361

[22] Filed: Jan. 5, 1981

[51] Int. Cl.³ .................. C08F 28/04; C08F 24/00; C08F 16/22
[52] U.S. Cl. .................. 526/266; 430/33; 526/270; 526/289; 526/292.9; 526/291; 526/314; 526/326; 568/642; 568/643
[58] Field of Search ............ 526/270, 266, 289, 293, 526/291, 292, 9, 303, 326, 313, 314, 385; 568/643

[56] References Cited

U.S. PATENT DOCUMENTS

| | | | |
|---|---|---|---|
| 2,710,801 | 6/1955 | Minsk | 526/313 |
| 2,735,837 | 2/1956 | Minsk | 526/313 |
| 3,267,073 | 8/1966 | Kun | 526/313 |
| 4,054,676 | 10/1977 | Weinshenker | 426/546 |

FOREIGN PATENT DOCUMENTS 1005734  4/1957  Fed. Rep. of Germany ...... 526/313

OTHER PUBLICATIONS

Rao, M. L. B. et al., Chem. and Indust. (London), 1961, p. 145.

Cassidy, H. G. et al., Oxidation-Reduction Polymers, Interscience Publ., New York, 1965, pp. 43, 44.
Manecke, G. et al., Makromol. Chem., 123 (1969), pp. 223-232.

*Primary Examiner*—C. A. Henderson
*Attorney, Agent, or Firm*—Louis G. Xiarhos

[57] ABSTRACT

The present invention relates to vinyl biphenyl compounds of the formula

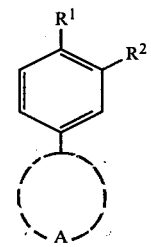

wherein one of $R^1$ and $R^2$ is vinyl and the other is hydrogen, and the cyclic moiety A is a -2,5-, -2,3-, or -3,4-di-OR-1-phenyl moiety wherein R is a hydroxy-protecting group, polymers prepared therefrom, and methods of preparation thereof. The subject vinyl biphenyls can be polymerized and the resultant polymers deblocked to remove the R groups and provide the corresponding polymeric dihydroxybiphenyls which can be employed as redox polymers.

9 Claims, No Drawings

LINEAR POLYMERS FROM BLOCKED VINYL BIPHENYL COMPOUNDS

BACKGROUND OF THE INVENTION

This invention relates to novel chemical compounds and, in particular, to novel vinyl biphenyl compounds, polymers prepared therefrom, and methods of preparation thereof.

Certain polymeric dihydroxyphenyl compounds are of interest for employment as redox polymers, i.e., as reducing or electron-transfer agents in redox reactions. It is reported by Rao et al., Chem. Ind. (London), 1961, 145 and in German Auslegeschrift No. 1,005,734, opened to public inspection Apr. 4, 1957 that a poly(4'-vinyl-2,5-dihydroxy-1,1'-biphenyl) resin is useful as an electron exchange resin. The Rao publication states that the resin may be prepared by diazotizing a cross-linked polyaminostyrene resin and reacting the resultant diazonium salt with hydroquinone under acid conditions. The cited Auslegeschrift discloses that quinone and hydroquinone can be bonded to the diazonium salt of a polyaminostyrene resin to form the electron-exchange resin. As noted by Cassidy et al., Oxidation-Reduction Polymers (Redox Polymers), Interscience Publ., New York, 1965, pp. 43-44, the diazonium salt of the cross-linked polyaminostyrene resin also reacts with the polymeric matrix to form additional crosslinks between the polymer chains. Thus, the method of preparation disclosed in these publications utilizes a cross-linked starting material, i.e., the polyaminostyrene resin, and effects additional cross-linking of the polymer.

In various applications it will be preferred that polymers such as poly(4'-vinyl-2,5-dihydroxy-1,1'-biphenyl, i.e., polymeric dihydroxybiphenyls, be linear in nature rather than resinous or cross-linked. Linear polymers tend to form films more readily than resinous polymers and are more readily coated in distinct layers. In addition, linear polymers in general are more soluble than these resinous or cross-linked analogs such that they may be more conveniently and readily dissolved, e.g., for purposes of coating a layer of the polymer or facilitating reaction thereof.

SUMMARY OF THE INVENTION

The present invention relates to certain monomeric vinyl biphenyl compounds which can be used in the preparation of linear polymeric dihydroxybiphenyls, to the linear polymeric dihydroxybiphenyls per se, and to methods of preparation thereof.

It is thus an object of the present invention to provide certain linear polymeric dihydroxybiphenyls.

It is another object of the present invention to provide a method of preparation of certain linear polymeric dihydroxybiphenyls.

It is another object of the present invention to provide vinyl biphenyl compounds which can be used in the preparation of linear polymeric dihydroxybiphenyls.

It is a further object of the present invention to provide a method of preparation of the vinyl biphenyl compounds of this invention.

Other objects of the present invention will be apparent from the description appearing hereinafter.

The vinyl biphenyl compounds of this invention are of the formula

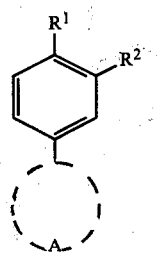

wherein one of $R^1$ and $R^2$ is vinyl and the other is hydrogen, and the cyclic moiety A is a -2,5-; -2,3-; or -3,4-di-OR-1-phenyl moiety wherein R is a hydroxy-protecting group. Biphenyl compounds of the above formula may be prepared by a process comprising the steps of (a) reacting a 3'- or 4'-halomethyl-x,y-di-OR-1,1'-biphenyl wherein -x,y- is -2,5-; -2,3-; or -3,4- and R is a hydroxy-protecting group with a triarylphosphine to form the corresponding 3'- or 4'-(triarylphosphonium)methyl-x,y-di-OR-1,1'-biphenyl halide and (b) reacting said 3'- or 4'-(triarylphosphonium)methyl-x,y-di-OR-1,1'-biphenyl halide with formaldehyde in the presence of a strong base to form the corresponding 3'- or 4'-vinyl-x,y-di-OR-1,1'-biphenyl. The vinyl biphenyl compounds of this invention can be polymerized to provide poly(3'- or 4'-vinyl-x,y-di-OR-1,1'-biphenyls) wherein x, y, and R are as previously defined. Accordingly, in another aspect of this invention, there is provided a polymer comprising recurring units of the formula

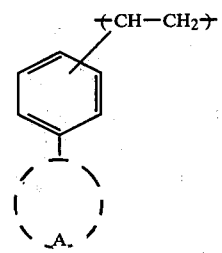

wherein the recurring vinyl grouping is in the 3' or 4'-position and A is as defined previously. The recurring units of the above formula in the polymer can be deblocked to remove the R groups, thereby providing the corresponding polymeric dihydroxybiphenyl. Polymers comprising recurring units of the above formula can be cross-linked polymers which may be formed by copolymerizing the vinyl biphenyl compounds hereof with comonomeric units capable of reacting to effect cross-linking of the polymer. In a preferred embodiment of this invention, the polymers of the above formula are linear in nature. The deblocking of such linear polymers provides the corresponding linear poly(3'- or 4'-vinyl-x,y-dihydroxy-1,1'-biphenyl) wherein x and y are as defined previously. Accordingly, in a preferred aspect of this invention, there is provided a linear polymer comprising recurring units of the formula

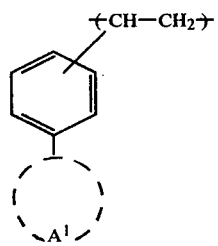

wherein the recurring vinyl grouping is in the 3'- or 4'-position and the cyclic moiety $A^1$ is a -2,5-; -2,3-; or -3,4-dihydroxy-1-phenyl moiety.

The polymeric dihydroxybiphenyls hereof are capable of participating in oxidation-reduction reactions and, thus, may be employed as redox polymers in a variety of applications, e.g., as antioxidants or, in a photographic application, as immobile scavengers for oxidized silver halide developing agents.

DETAILED DESCRIPTION OF THE INVENTION

According to the present invention, certain vinyl biphenyl compounds have been discovered which can be used to prepare linear polymeric dihydroxybiphenyls. The vinyl biphenyl compounds are of the formula

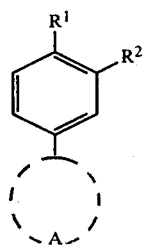

wherein one of $R^1$ and $R^2$ is vinyl and the other is hydrogen, and the cyclic moiety A is a -2,5-; -2,3-; or -3,4-di-OR -1-phenyl moiety, i.e., a moiety of the formula

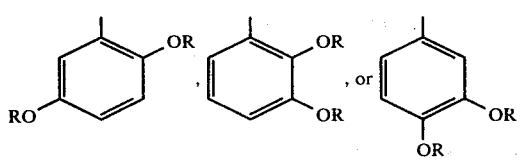

wherein R is a hydroxy-protecting group, which moiety may be further substituted with one or more substituents compatible with the reagents and reaction conditions utilized in polymerizing the vinyl biphenyl compounds and in deblocking the resultant polymers. In a preferred embodiment, $R^1$ is vinyl and $R^2$ is hydrogen.

In the preparation of polymeric dihydroxybiphenyls, the vinyl biphenyl compounds are polymerized and the resultant polymer deblocked to remove the hydroxy-protecting groups R and regenerate the hydroxy groups. Accordingly, groups selected for use as hydroxy-protecting groups in the vinyl biphenyls should be capable of protecting the hydroxy groups against reaction under the conditions encountered in the polymerization reaction and should also be capable of being removed from the polymeric product so as to regenerate the hydroxy groups. Protecting groups capable of removal under acidic, neutral, or basic conditions may be employed. Suitable protecting groups R include lower alkyl groups of 1 to 6 carbon atoms such as methyl, ethyl, isopropyl, and tert-butyl; methoxymethyl; methylthiomethyl; phenacyl; p-bromophenacyl; 2-tetrahydrofuranyl; 2-tetrahydropyranyl; ethoxycarbonyl; 2,2,2-trichloroethoxycarbonyl; and acyl, e.g., acetyl and benzoyl.

It will be understood that the moiety A of the vinyl biphenyl compounds may be substituted with substituents in addition to the —OR groups, provided that such substituents are compatible with the reaction conditions employed in polymerization of the monomer and in the subsequent deblocking reaction. Such substituents should also not unduly hinder the conduct of these reactions, e.g., by unacceptably slowing a reaction rate. It will be appreciated by those in the art that the nature of any such substituents and the substitution pattern thereof will, in general, affect the oxidation-reduction potential of a redox polymer ultimately prepared from the substituted vinyl biphenyl. Generally, electron-attracting substituents will increase the redox potential and electron-donating groups will lower it. Substituents in addition to —OR which may be present in the starting materials for the above process include lower alkoxy, nitro, cyano, carboxy, sulfo, formyl, chloro, bromo, and iodo, as well as carboxamido groups, e.g.,

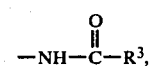

and acyl groups, e.g.,

wherein $R^3$ and $R^4$ are alkyl.

Preferred monomeric biphenyls are the 4'-vinyl-2,5-di-OR-1,1'-biphenyls, i.e., biphenyls of the formula

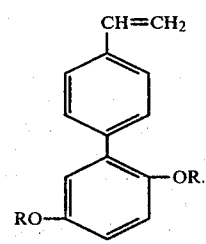

It will be appreciated that these preferred compounds can be employed to prepare linear poly(4'-vinyl-2,5-dihydroxy-1,1'-biphenyl), which may be considered a polymeric analog of 4'-methylphenylhydroquinone, the latter compound being a well known silver halide developing agent.

Specific examples of the monomeric biphenyls of the present invention include:

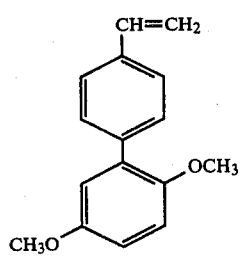
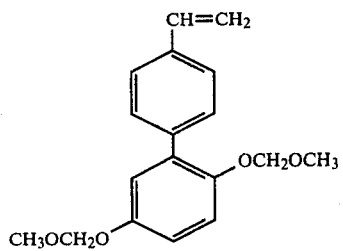
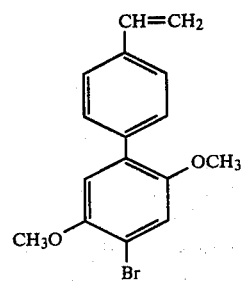
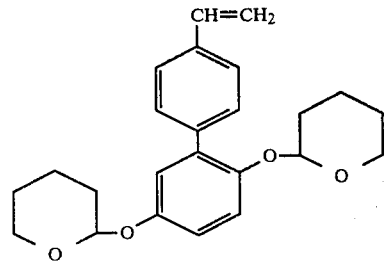
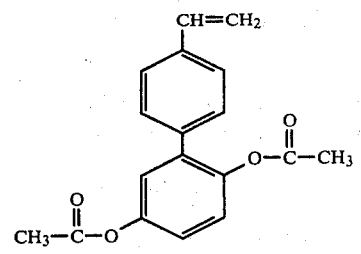
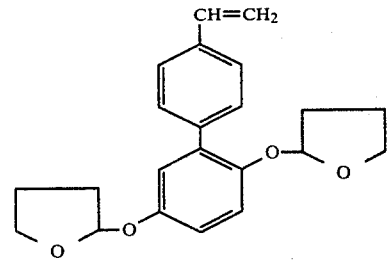
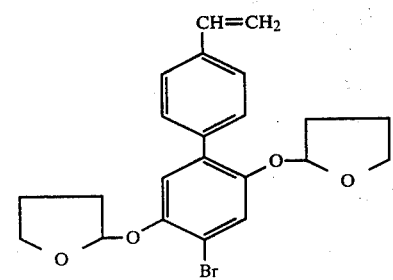
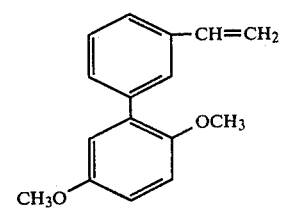
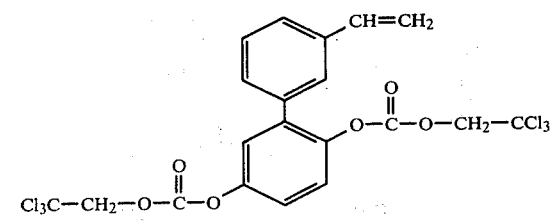
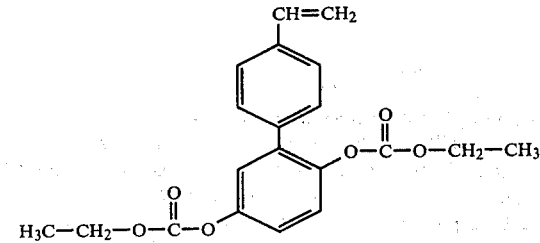
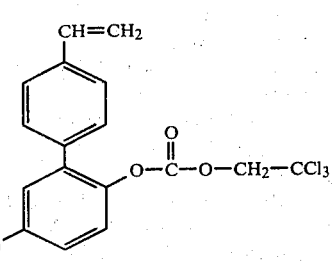

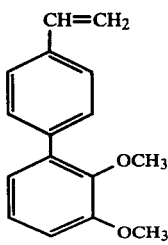 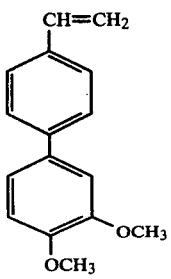

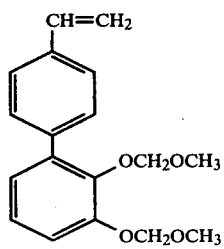 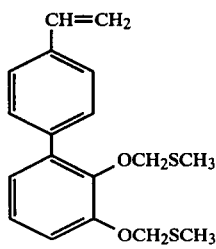

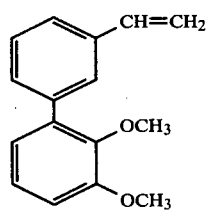 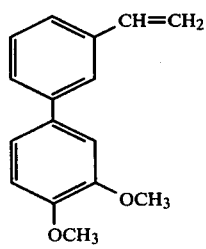

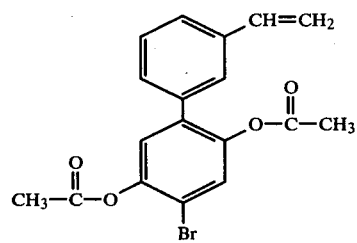 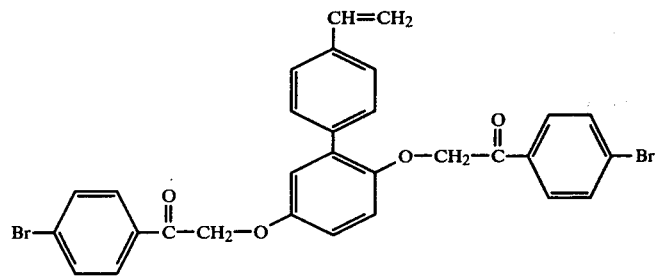

The vinyl biphenyl compounds of this invention can be prepared by a process comprising the steps of (a) reacting a 3'- or 4'-halomethyl-x,y-di-OR-1,1'-biphenyl wherein -x,y- is -2,5-; -2,3-; or -3,4- and R is a hydroxy-protecting group with a triarylphosphine to form the corresponding 3'- or 4'-(triarylphosphonium)methyl-x,y-di-OR-1,1'-biphenyl halide; and (b) reacting said 3'- or 4'-(triarylphosphonium)methyl-x,y-di-OR-1,1'-biphenyl halide with formaldehyde in the presence of a strong base to form the corresponding 3'- or 4'-vinyl-x,y-di-OR-1,1'-biphenyl. This process is illstrated below using, as specific reagents, a 4'-bromomethyl-2,5-di-OR-1,1'-biphenyl as the starting material, triphenylphosphine as the triarylphosphine, and hydroxide anion as the strong base. The following reaction sequence is illustrative only and not intended to be of limiting effect:

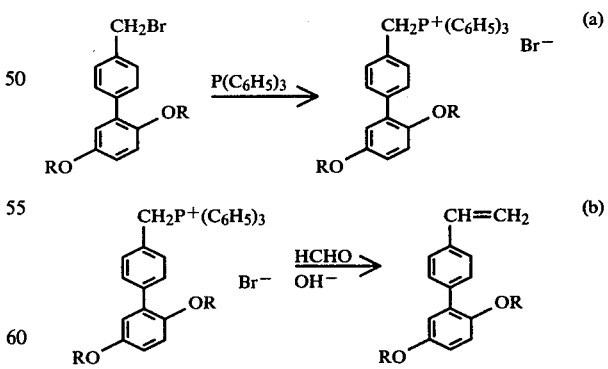

The phosphonium salt formation reaction, step (a) can be conducted in any suitable organic solvent, e.g., tetrahydrofuran, benzene, toluene, or dioxane. Preferred organic solvents are those in which the phosphonium halide salts produced by the reaction are insoluble such that they precipitate from the reaction mixture subsequent to formation. A preferred triarylphosphine for use in this reaction is triphenylphosphine although other triarylphosphines, e.g., tritolylphosphine may be employed. The reaction may be conducted at temperatures of about 20° C. to about 100° C. While the reaction temperature is not critical, it may prove desirable to conduct the reaction at elevated temperatures to promote solubility of the reagents or a faster reaction rate. It is preferred that the reaction mixture be cooled at the completion of the reaction to promote efficient precipitation of the phosphonium halide salts. The precipitated salts can then be isolated by filtration and reacted in accordance with step (b) of the above process.

The condensation reaction, step (b), may be conducted in an organic solvent, e.g., diethylether or hexane, employing as a source of formaldehyde either gaseous formaldehyde or paraformaldehyde. The employment of an organic solvent, particularly an anhydrous organic solvent, and of a non-nucleophilic base, e.g., sodium hydride, may prove to be of benefit where the hydroxy-protecting groups undergo an unacceptable degree of displacement or removal in the presence of aqueous alkali or nucleophilic species. The employment of such an anhydrous, non-nucleophilic reaction medium may prove to be desirable in cases where protecting groups such as acyl, ethoxycarbonyl, and trichloroethoxycarbonyl are employed.

With regard to conduct of the condensation reaction on phosphonium salts comprising protecting groups having satisfactory stability in the presence of aqueous alkali or nucleophilic species, the reaction is preferably conducted in aqueous formaldehyde solution. Generally, the phosphonium halide salts will be soluble in aqueous solvent systems such that conduct of the reaction is facilitated. Any suitable strong base may be employed in conjunction with the aqueous formaldehyde system and specific mention may be made of n-butyllithium, phenyllithium, potassium tert-butoxide, sodium hydride and sodium amide. A preferred strong base for use in aqueous formaldehyde systems is hydroxide anion which may be supplied to the reaction medium by addition of an alkali-metal hydroxide, e.g., by addition of an aqueous solution of sodium hydroxide or potassium hydroxide. Preferably, the phosphonium halide salt is dissolved or suspended in the aqueous formaldehyde solution and an aqueous solution of the strong base gradually added thereafter to the reaction solution. A by-product of the condensation reaction is a triarylphosphine oxide which generally may be separated from an organic solvent reaction mixture by filtration thereof and from an aqueous reaction mixture by extraction thereof with an organic solvent in which triphenylphosphine oxide is insoluble, e.g., n-hexane. A vinyl compound produced by the reaction may be recovered from an organic solvent by any suitable means such as precipitation of the compound or evaporation of the solvent and may be recovered from an aqueous solvent by extraction with a suitable organic solvent followed by precipitation of the compound or evaporation of the solvent.

A preparation of the 3'- or 4'-halomethyl-x,y-di-OR-1,1'-biphenyl used as a starting material in preparing the vinyl biphenyls hereof is disclosed in the copending U.S. patent application Ser. No. 222,682 of Avinash C. Mehta, filed of even date and abandoned in favor of continuation-in-part U.S. patent application Ser. No. 313,944, filed Oct. 22, 1981. As disclosed therein, such halomethyl compounds can be prepared by blocking the hydroxy groups of a 3'- or 4'-methyl-x,y-dihydroxy-1,1'-biphenyl with a hydroxy-protecting group to form the corresponding 3'- or 4'-methyl-x,y-di-OR-1,1'-biphenyl wherein x, y is -2,5-; -2,3-; or -3,4- and R is a hydroxy-protecting group, and reacting the 3'- or 4'-methyl-x,y-di-OR-1,1'-biphenyl with a benzylic halogenating agent to prepare the corresponding 3'- or 4'-halomethyl-x,y-di-OR-1,1'-biphenyl. This method of preparation is illustrated below illstratively employing, as specific reagents, 4'-methyl-2,5-dihydroxy-1,1-biphenyl as the starting material, dimethylsulfate and hydroxide anion as the reagents used to effect blocking of the hydroxy groups by conversion thereof to methyl ether moieties, and N-bromosuccinimide (NBS) as the benzylic halogenating agent:

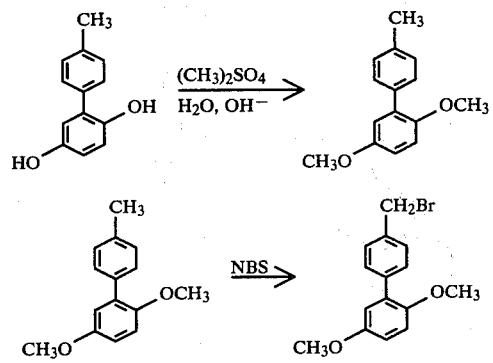

As further disclosed therein, methods of blocking hydroxy groups with protecting groups are well known in the art and any suitable method of accomplishing same may be employed to produce the 3'- or 4'-methyl-x,y-di-OR-1,1'-biphenyls. Methods which may be employed to effect blocking of the hydroxy groups include methylation with dimethylsulfate in the presence of aqueous alkali as illustrated above and as described in Example 1 hereinafter; acylation with acetic anhydride as described, for example, in the previously cited copending applications of Mehta, U.S. Ser. Nos. 222,682 and 313,944; methoxy methylation as described, for example, by Kaoru Fuji et al., Synthesis, 4, pp. 276–277 (1975); tetrahydrofuranylation as described, for example, by C. G. Kruse et al., Tetrahedron Lett., 20, p. 1725 (1976); tetrahydropyranylation as described, for example, by W. F. Parham et al.,J. Amer. Chem. Soc., 70, pp. 4187–4189 (1948); and 2,2,2-trichloroethoxycarbonylation as described, for example, by Just et al., Synthesis, p. 457 (1976).

The halogenation of the 3'- or 4'-methyl-x,y-di-OR-1,1'-biphenyl is referred to in the cited copending applications of Mehta, U.S. Ser. Nos. 22,682 and 313,944, as a benzylic halogenation reaction, i.e., a halogenation reaction whereby a benzyl halide moiety is produced. A halogenating agent capable of effecting such halogenation is therein referred to as a benzylic halogenating agent. Any halogenating agent capable of effecting such halogenation of a 3'- or 4'-methyl-x,y-di-OR-1,1'-biphenyl may be used as the benzylic halogenating agent, provided that it does not degrade the biphenyl compound or effect halogenation of either of the phenyl rings thereof to an unacceptable extent. Benzylic halogenating agents which may be employed include elemental bromine and chlorine, sulfuryl chloride, N-bromosaccarin, tetramethylammonium bromide, N,N-dibromobenzenesulfonamide, bromotrichloromethane, and carbon tetrabromide. A preferred benzylic halogenating agent is N-bromosuccinimide.

As further disclosed in the cited copending applications of Mehta, U.S. Ser. Nos. 222,682 and 313,944, the amount of benzylic halogenating agent employed in the halogenation reaction can vary with the particular halogenating agent. In a preferred practice, the ratio of benzylic halogenating agent to 3'- or 4'-methyl-x,y-di-OR-1,1'-biphenyl is about 1:1 on a molar basis.

As further disclosed therein, in the conduct of the halogenation reaction nuclear or ring halogenation may occur in addition to, or in lieu of, benzylic halogenation, thus producing a mixture of halogenated products. For example, bromination of 4'-methyl-2,5-dimethoxy-1,1'-biphenyl can produce a mixture comprising the following three products:

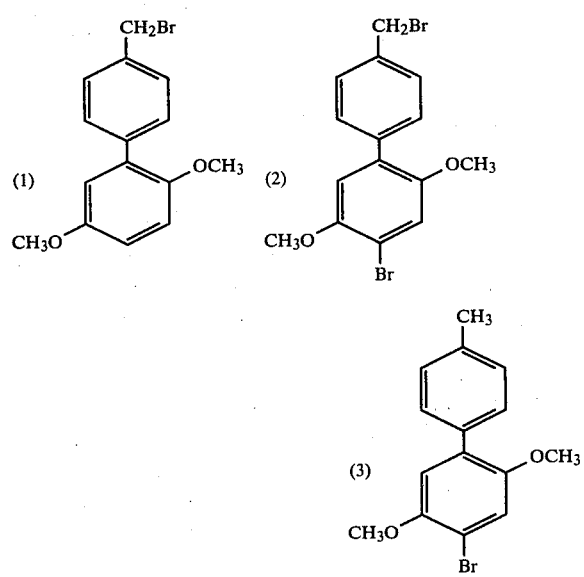

Ring halogenated products may be useful herein in providing halogen substituted vinyl biphenyls or polymeric dihydroxy biphenyls. In general, however, it will be desired to employ as starting materials herein halomethyl compounds which do not have halogen ring substituents. Thus, it will generally be desired to minimize ring halogenation during the benzylic halogenation reaction. As disclosed in the cited copending applications of Mehta, U.S. Ser. Nos. 222,682 and 313,944, ring halogenation may be minimized during the benzylic halogenation reaction by methods well known in the art, e.g., use of reaction conditions which promote benzylic halogenation rather than nuclear or ring halogenation. Thus, for example, N-bromosuccinimide is preferably employed as a benzylic halogenating agent in an organic solvent and in association with a free radical initiator, such as dibenzoyl peroxide or azobisisobutyronitrile, which can promote formation of bromine radicals and, thereby, promote the benzylic halogenation reaction. Ring halogenation may also be minimized by employment of hydroxy-protecting groups which tend to deactivate the cyclic moiety A toward halogenation. In particular, protecting groups which withdraw electrons from the resonance system of the 1-phenyl ring will generally deactivate the moiety A such that halogenation thereof is minimized or essentially non-occurring. The desired 3'- or 4'-halomethyl-x,y-di-OR-1,1'-biphenyl may thus be prepared in high yield and essentially free of ring-halogenated contaminants.

Should a mixture of halogenated products result from the benzylic halogenation reaction, the desired starting material for preparing a particular vinyl biphenyl of this invention may be separated from the mixture by any suitable purification technique, e.g., recrystallization or chromatographic techniques. Generally, however, it will prove desirable to react such a mixture in toto in step (a) of the above process and thereafter separate undesired materials from the desired product. Thus, for example, compound (3) of the above illustrated representative mixture will not undergo phosphonium salt formation during step (a) and will, accordingly, possess subsequent to step (a) solubility characteristics substantially different from the phosphonium halide salts formed from compounds (1) and (2). The phosphonium halide salts prepared from compounds (1) and (2) will generally precipitate from the organic reaction solvent used in step (a), leaving in solution the unreacted compound (3). A mixture of phosphonium halide salts, e.g., the phosphonium halide salts of compounds (1) and (2), can be carried through the condensation reaction of step (b) to produce a mixture of the corresponding vinyl compounds which can be separated by suitable purification techniques, e.g., recrystallization or column chromatography.

The halogenation reaction may be conducted in any inert organic solvent known in the art to be useful in the conduct of a benzylic halogenation reaction. In order to minimize ring halogenation, the solvent should be substantially free of impurities which promote formation of positive halogen ions, said ions being generally recognized as effecting aromatic ring halogenation. For example, relatively small amounts of water in the organic solvent may substantially increase the formation of positive halogen ions and, thus, the incidence of ring halogenation. Accordingly, consistent with the objective of minimizing ring halogenation, solvents used in the halogenation reaction should be substantially anhydrous. Solvents which may be employed include methyl formate, benzene, and mixtures of methylacetate/dichloromethane. A particularly preferred solvent is carbon tetrachloride.

The 3'- or 4'-vinyl-x,y-di-OR-1,1'-biphenyls of this invention can be polymerized to provide novel poly(3'- or 4'-vinyl-x,y-di-OR-1,1'-biphenyls). Accordingly, the present invention provides polymers comprising recurring units of the formula

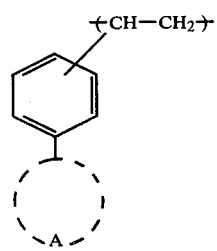

wherein the recurring vinyl grouping

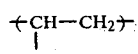

is in the 3'- or 4'-position and the cyclic moiety A is a -2,5-; -2,3-; or -3,4-di-OR-1-phenyl moiety wherein R is a hydroxy-protecting group. Polymers comprising the above recurring units can be cross-linked copolymers which can be prepared by copolymerizing the vinyl biphenyls of this invention with comonomers which are capable of undergoing reaction to effect cross-linking of the polymer and effecting said cross-linking during or subsequent to the polymerization reaction. In a preferred embodiment of this invention, polymers comprising the above recurring units are linear homo- or copolymers, i.e., polymers wherein the recurring units are connected one to another in linear sequence without any significant degree of cross-linking between the polymer chains. These preferred linear polymers can be prepared by homopolymerizing the monomeric biphenyls of this invention or by copolymerizing the monomeric biphenyls with comonomers which do not effect cross-linking of the polymer.

The poly(3'- or 4'-vinyl-x,y-di-OR-1,1'-biphenyls) of this invention can be deblocked to remove the hydroxy-protecting groups and regenerate the hydroxy groups to provide the corresponding poly(3'- or 4'-vinyl-x,y-dihydroxy-1,1'-biphenyls). Thus, deblocking a linear poly(3'- or 4'-vinyl-x,y-di-OR-1,1'-biphenyl) of this invention to remove the hydroxy-protecting groups and regenerate the hydroxy groups provides the corresponding linear poly(3'- or 4'-vinyl-x,y-dihydroxy-1,1'-biphenyl). Accordingly, in a preferred aspect of this invention, there are provided linear polymers comprising recurring units of the formula

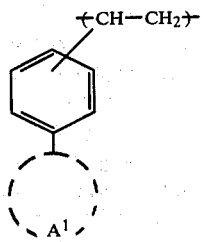

wherein the recurring vinyl grouping is in the 3'- or 4'-position and the cyclic moiety $A^1$ is a -2,5-; -2,3-; or -3,4-dihydroxy-1-phenyl moiety.

Consistent with the vinyl biphenyls of this invention, the moieties A and $A^1$ of the above polymers can be further substituted with one or more substituents compatible with the reagents and reaction conditions utilized in the polymerization and deblocking reactions. Such substituents can include certain groups which undergo reaction during the deblocking step, e.g., lower alkoxy groups on the moiety A may undergo reaction, essentially also a deblocking reaction, during the deblocking step, thereby providing an additional hydroxy substituent on the moiety $A^1$.

Consistent with nomenclature often used in the art in reference to dihydroxybiphenyl moieties, it will be appreciated that if the moiety $A^1$ is a 2,5-dihydroxy-1-phenyl moiety, a polymer hereof containing same may alternatively be referred to as a linear poly(3'- or 4'-vinylphenylhydroquinone). Further, if $A^1$ is a 2,3- or 3,4-dihydroxy-1-phenyl moiety, a polymer hereof containing same may alternatively be referred to as a linear poly(3- or 4'-vinylphenylcatechol).

The polymerization and deblocking reactions are illustrated below using a 4'-vinyl-2,5-di-OR-1,1'-biphenyl as a starting material:

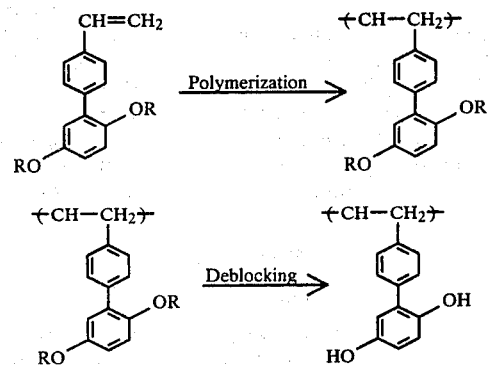

The polymerization reaction may be carried out employing different polymerization techniques such as bulk, suspension, emulsion, or, preferably, solution polymerization. The reaction can be initiated chemically, e.g., by free radical or redox initiators, or by other means such as heat or incident radiation. As examples of chemical initiators, mention may be made of azobisisobutyronitrile, potassium persulfate, hydrogen peroxide, and diazoaminobenzene. It will be appreciated that the chosen means of initiation should not degrade or otherwise adversely react with either the starting monomer or polymeric product. The polymerization may be conducted at a temperature of about 25° C. to about 100° C. or higher. In the utilization of chemical initiators, the optimum reaction temperature will generally be dependent on the nature of the initiator, e.g., its stability at a given temperature, and on the rate at which the monomer or mixture of monomers undergo polymerization in the presence of the initiator. The amount of initiator employed may be varied to suit particular needs. In general, less than 5% by weight of initiator, based on the starting weight of the monomer or monomers, may be used.

The vinyl biphenyls of this invention can be copolymerized with other suitable ethylenically unsaturated comonomers. In general, the comonomers will be chosen to impart desired properties to the redox polymer ultimately prepared. Physical properties of the redox polymer which can be modulated by use of appropriate comonomers include solubility, swellability, and viscosity. Comonomers which may be utilized include styrene, ethylene, methylacrylate, ethylacrylate, butylacrylate, methylmethacrylate, acrylamide, methacrylamide, acrylic acid, and methacrylic acid. Comonomers which may be employed to effect cross-linking of the copoly(3'- or 4'-vinyl-x,y-di-OR-1,1'-biphenyls) include difunctional comonomers such as 1,4-divinylbenzene.

In general, the deblocking reaction may be conducted employing procedures commonly used in the art for removing hydroxy-protecting groups. The deblocking reaction may be conducted under acidic, neutral, or basic conditions as appropriate for removal of a given protecting group. The reaction is preferably conducted under an inert atmosphere to minimize the possibility of oxidation of the redox polymer. Protecting groups capable of removal under acidic conditions, such as alkyl, tetrahydrofuranyl, tetrahydropyranyl, and phenacyl, can be removed by treatment of the polymer with, for example, mineral acids such as hydrochloric acid or hydrobromic acid or by treatment with boron tribromide. Protecting groups capable of removal under basic conditions, e.g., acyl, ethoxycarbonyl, and 2,2,2-trichloroethoxycarbonyl can be removed in the presence of, for example, aqueous alkali hydroxides such as aqueous sodium hydroxide and aqueous potassium hydroxide so as to generate hydroxy anion moieties which can be protonated by treatment with acid.

The following examples are given to further illustrate the present invention and are not intended to be of limiting effect.

EXAMPLE 1

Preparation of 4'-vinyl-2,5-dimethoxy-1,1'-diphenyl (a) To a suspension of 138 g. (0.69 mole) of 4'-methyl-2,5-dihydroxy-1,1'-biphenyl in 600 ml. of deaerated water at 70° C. were added simultaneously 270 g. of a deaerated 50% (w/w) aqueous solution of sodium hydroxide (3.38 moles NaOH) and 258 g. (2.05 moles) of dimethylsulfate over 30 minutes with stirring under a nitrogen atmosphere. The temperature during the addition was maintained at 80°–87° C. After stirring overnight at ambient temperature of about 25° C., 86 g. (0.68 mole) of dimethyl sulfate and 90 g. of 50% (w/w) aqueous sodium hydroxide (1.13 moles NaOH) were added simultaneously and stirring continued an additional 24 hours. The reaction mixture was then chilled in ice, the tan colored crystals filtered, washed well with water and dried in a vacuum oven. After recrystallization in methanol, followed by drying in a vacuum oven, 120 g. of 4'-methyl-2,5-dimethoxy-1,1'-biphenyl were obtained (melting range 65°–66° C.).

(b) A mixture of 22.8 g. (0.1 mole) of 4'-methyl-2,5-dimethoxy-1,1'-biphenyl prepared in accordance with step (a) above, 18 g. (0.1 mole) N-bromosuccinimide, and 0.24 g. (0.001 mole) of dibenzoyl peroxide in 300 ml. carbon tetrachloride was heated at reflux for 18 hours. The reaction mixture was cooled and the precipitated succinimide removed by filtration. The solvent was removed on a rotary evaporator yielding 30.7 g. of a thick syrupy residue comprising, in major proportion, 4'-bromomethyl-2,5-dimethoxy-1,1'-biphenyl.

(c) The residue from the preceding reaction step (b) (30.7 g.) was dissolved in 300 ml. of tetrahydrofuran, 26.2 g. (0.1 mole) of triphenylphosphine added, and the mixture stirred at ambient temperature of about 25° C. for 16 hours. The mixture was then refluxed for one hour, cooled, and the resultant precipitate filtered, washed first with benzene and then tetrahydrofuran, and dried in a vacuum oven at 60° C. Yield of 38 g. of material. NMR spectrum in CDCl₃ showed three different methoxyl resonances as would be expected from a mixture of 4'-(triphenylphosphonium)methyl-2,5-dimethoxy-1,1'-biphenyl bromide and 4'-(triphenylphosphonium)methyl-4-bromo-2,5-dimethoxy-1,1'-biphenyl bromide.

(d) The 38 g. of material obtained in step (c) were suspended in 66 ml. of a 37% (w/w) aqueous formaldehyde solution and 25 ml. of a 50% (w/w) solution of sodium hydroxide were added dropwise with stirring over 30 minutes. After stirring for 2 hours, the reaction mixture was extracted with methylene chloride, the extract washed with water and saturated sodium chloride solution, and dried over anhydrous sodium sulfate. Removal of the solvent on a rotary evaporator left 10.3 g. of a residue which was extracted with n-hexane. The n-hexane was evaporated to yield 4.8 g. of a mixture comprising 4'-vinyl-2,5-dimethoxy-1,1'-biphenyl and 4'-vinyl-4-bromo-2,5-dimethoxy-1,1'-biphenyl. The mixture was chromatographed on 150 g. of Florisil adsorbent (commercially available from the Floridin Co., Pittsburgh, Pa.) using a 60:40 by volume mixture of hexane and toluene. 2.9 g. of 4'-vinyl-2,5-dimethoxy-1,1'-biphenyl were obtained as an oil. Elemental analysis calculated for $C_{16}H_{16}O_2$: C, 79.97; H, 6.71. Found: C, 79.53; H, 6.80.

EXAMPLE 2

Preparation of poly(4'-vinyl-2,5-dihydroxy-1,1'-biphenyl) as a linear homopolymer (a) A solution of 2 g. of the 4'-vinyl-2,5-dimethoxy-1,1'-biphenyl prepared in Example 1 and 0.07 g. azobisisobutyronitrile in benzene was deaerated with nitrogen and sealed in a glass tube under vacuum. The solution was heated at 63° C. for 48 hours. The contents of the tube were cooled and poured with stirring into 250 ml. of methanol. The precipitated linear polymer was filtered, washed with methanol, and dried in a vacuum oven. Yield of 1.7 g. of poly(4'-vinyl-2,5-dimethoxy-1,1'-biphenyl). Elemental analysis calculated for $C_{16}H_{16}O_2$: C, 79.97; H, 6.71. Found: C, 79.62; H, 6.27.

(b) To a solution of 1.2 g. of the poly(4'-vinyl-2,5-dimethoxy-1,1'-biphenyl) prepared in section (a) of this Example in 10 ml. of methylene chloride, under nitrogen and cooled to −50° C., was added dropwise a solution of 1.2 ml. of boron tribromide in 4 ml. of methylene chloride. The addition was carried out over 20 minutes. The mixture was allowed to warm to ambient temperature and stirred overnight. It was then refluxed for one hour, cooled and poured into ice-water containing 6 g. of sodium acetate trihydrate. Methylene chloride was removed by bubbling nitrogen through the mixture and the linear homopolymer was isolated by decantation and washed with ether. Dissolution of the polymer in methanol followed by precipitation into water under nitrogen gave 0.8 g. of linear poly(4'-vinyl-2,5-dihydroxy-1,1'-biphenyl) as an off-white solid. NMR in d₆-DMSO was consistent with the structure. The polymer was soluble in aqueous alkali. Elemental analysis calculated for $C_{14}H_{12}O_2$: C, 79.22; H, 5.70. Found: C, 78.9; H, 5.5.

The poly(4'-vinyl-2,5-dihydroxy-1,1'-biphenyl) prepared in this Example was dissolved in aqueous sodium hydroxide. The solution was applied to a previously exposed silver halide emulsion layer coated on a paper support. After several minutes the silver halide emulsion blackened indicating development thereof by the dissolved polymer, i.e., reduction of the silver halide to silver metal.

The polymeric dihydroxybiphenyls of this invention are capable of participating in oxidation-reduction reactions and, accordingly, may be employed in a variety of applications as redox polymers, for example, an antioxidants or, in a photographic application, as immobile scavengers for oxidized silver halide developing agents.

What is claimed is:

1. A linear polymer comprising recurring units of the formula

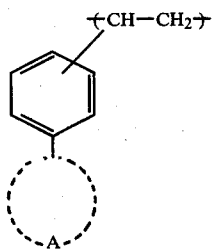

wherein the recurring vinyl grouping is in the 3'- or 4'-position and the cyclic moiety A is a 2,5-; -2,3-; or -3,4-di-OR-1-phenyl moiety wherein R is a hydroxy-protecting group capable of being removed so as to regenerate the hydroxy group.

2. A polymer of claim 1 wherein said linear polymer is a homopolymer.

3. A polymer of claim 1 wherein said R is selected from the group consisting of lower alkyl having 1 to 6 carbon atoms, methoxymethyl, methylthiomethyl, phenacyl, p-bromophenacyl, 2-tetrahydrofuranyl, 2-tetrahydropyranyl, ethoxycarbonyl, 2,2,2-trichloroethoxycarbonyl, and acyl.

4. A polymer of claim 3 wherein said R is lower alkyl having 1 to 6 carbon atoms.

5. A polymer of claim 4 wherein said R is methyl.

6. A polymer of claim 1 wherein said recurring vinyl grouping is in the said 4'-position.

7. A polymer of claim 6 wherein said moiety A is the said 2,5-di-OR-1-phenyl moiety.

8. A polymer of claim 7 wherein said R is methyl.

9. A polymer of claim 8 wherein said linear polymer is homopolymer.

* * * * *